Patented Jan. 24, 1928.

1,657,171

UNITED STATES PATENT OFFICE.

GEORGE J. MILLER, OF DOUGLAS, ARIZONA.

PROCESS OF RECLAIMING RUBBER.

No Drawing.  Application filed December 22, 1926.  Serial No. 156,525.

My invention relates to the art of reclaiming rubber such as is found in old tires, tubes or other manufactured articles composed largely of rubber. It is general practice in preparing rubber for manufacture into automobile tires or other articles, to incorporate with and into the rubber certain foreign ingredients for the purpose of improving its quality, to meet the special requirements of use, or to cheapen it, or to color it, or to facilitate the process of manufacture, etc. One such ingredient, sulphur, is always chemically combined with the rubber, making of it "vulcanized rubber" and usually there is more or less "free" sulphur, which is not chemically combined with the rubber. Cotton is nearly always in automobile tires. Such foreign ingredients comprise what are technically known as "fillers", "pigments", "accelerators", etc., (and also cotton in the case of tires). Such augmented rubber is practically valueless for any purpose except that for which it was especially made, and when such manufactured article is worn out, it becomes waste material.

The object of my process is to remove from such worn out articles, or waste rubber material, or rubber scrap, such an amount of the admixed foreign ingredients as to leave the recovered or "reclaimed" rubber sufficiently free of them, and in such condition as regards elasticity, deformability, and other qualities pertaining to rubber, as to permit of its being advantageously and profitably worked up again into new rubber articles, and as to permit of the re-adding of such foreign ingredients as may be necessary to adjust it to its new use.

In its general nature my process is based on certain peculiarities of the solvent action of hot kerosene oil, under controlled and regulated conditions, upon rubber compound, and the present process embodies, in its generic nature, the treatment of the rubber where the presence of some solid fillers in the finished rubber does not constitute an objection, and the process is carried out as follows, viz:

1. The rubber compound is ground by any adequate grinding method, to pass a screen of 16 meshes to the inch, or finer or coarser as desired.

2. The separation of the rubber compound and cotton, when cotton is present, is accomplished by boiling the ground rubber compound, with its clinging fragments of cotton, in a solution of zinc chloride, acidified with hydrochloric acid, which boiling in such solution dissolves the fabric, and also dissolves some of the acid-soluble solid fillers in the rubber compound.

When the cotton has entirely dissolved, the rubber compound is removed from the solution, by draining or filtration, and is then washed free of adhering solution, and without drying is put through the next operation, as follows:

3. The ground rubber compound thus freed of cotton and some solid fillers, is placed in a vessel suitable for heating, and covered with kerosene oil, which is kept replenished as the oil soaks into the rubber compound, so that there is always a considerable excess of oil over the rubber compound. The mixture is heated and maintained at a temperature varying from 120 degrees on the centigrade scale to 150 degrees, of the same scale, the temperature to be used being determined by the hardness or softness of the rubber compound, the harder varieties requiring the higher temperature.

4. The hot kerosene oil dissolves out of the rubber compound free sulphur, much impurities of an organic nature, as vulcanized oils, bitumen products, etc., soaks out some impurities that are not really soluble, and loosens a certain amount of the solid fillers, which to that extent are dropped from the rubber compound, leaving undissolved practically pure vulcanized rubber containing some solid fillers. Care is exercised that the temperature and time of heating are so regulated that the vulcanized rubber does not begin to dissolve. During the heating operation the mass is constantly stirred or otherwise agitated to prevent the rubber compound becoming overheated from contact with the hot metal of the vessel. This heating operation is continued until tests or inspection of the rubber show that it has lost all the impurities it can lose under the circumstances, such time usually varying from one half an hour to one and one-half hours.

The vulcanized rubber and kerosene oil are then separated by draining off the oil, and the rubber put to soak in some more volatile reagent, as gasoline, carbon bisulphide, carbon tetrachloride, etc., which will wash out the absorbed kerosene oil from the rubber, and which can itself be easily dried out of the vulcanized rubber without having permanently injured it in any way. Several changes of these washing reagents may be used, or any combination of them; for instance, the first wash may be made with gasoline, to eliminate the bulk of the kerosene, and the gasoline itself may be subsequently washed out with the more expensive carbon tetrachloride, which is recommended, in every case where it can be advantageously used, because of its non-inflammability.

When the rubber is washed free of kerosene oil, which requires several hours' soaking, it is dried, either by air-drying, or in a suitable drying arrangement by means of which the volatile reagent may be recovered for re-use.

From the foregoing description it is thought that my invention will be readily understood by those skilled in the art.

What I claim is:

1. The process of reclaiming rubber from a mass which contains rubber and cotton and other impurities, said process consisting in grinding the mass into particles, boiling the ground mass in a solution of zinc chloride acidified with hydrochloric acid until the cotton is dissolved; removing the mass from the solution and washing it free of adhering solution; then placing the washed mass in a kerosene oil bath and maintaining the same at a temperature of from 120° C. to 150° C. until the rubber in the mass has lost the maximum possible amount of the impurities which it contained, without causing dissolution of the rubber, then separating the rubber and kerosene oil and washing the separated rubber with a suitable washing agent to remove the kerosene, and finally drying the rubber.

2. The process of reclaiming rubber from a mass which contains rubber and cotton and other impurities, said process consisting in grinding the mass into particles, boiling the ground mass in a solution of zinc chloride acidified with hydrochloric acid until the fabric is dissolved; removing the mass from the solution and washing it free of adhering solution; then placing the washed mass in a kerosene oil bath and maintaining the same at a temperature of from 120° C. to 150° C. until the rubber in the mass has lost the maximum possible amount of the impurities which it contained, without causing dissolution of the rubber, then separating the rubber and kerosene oil and washing the separated rubber with a volatile washing agent that is miscible with kerosene oil in order to remove the kerosene oil from the rubber, and finally drying the rubber to free it from the washing agent.

3. The process of reclaiming rubber containing cotton and other impurities, said process comprising the following steps in the order mentioned, viz: reducing the rubber mass to small particles, separating the rubber compound and the cotton by boiling the mass in a suitable acidulated solution that will dissolve the cotton and some of the acid-soluble fillers contained in the rubber compound, removing the rubber compound from the solution and washing it free of adhering solution, placing the rubber compound in a bath of kerosene oil and heating the same to a temperature of from 120° C. to 150° C. until the maximum amount of impurities have been dissolved or removed from the rubber, without causing dissolution of the rubber, separating the rubber and kerosene oil and washing the rubber with a suitable volatile washing fluid to remove the kerosene oil and then drying the rubber to free it of the washing fluid.

4. The process of reclaiming rubber from a mass which contains rubber and cotton and other impurities, said process consisting in treating the ground mass of rubber, cotton and other impurities with a solution of zinc chloride acidified with hydrochloric acid to dissolve the cotton, separating the rubber from the solution after the cotton has been dissolved, placing the rubber thus freed of cotton in a bath of kerosene oil and maintaining the same at a temperature of from 120° C. to 150° C. until the rubber is freed of free sulphur and impurities of an organic nature and the maximum amount desirable of solid fillers, then separating the rubber from the kerosene oil.

5. The process of reclaiming rubber which includes the step of treating the rubber to a bath of hot kerosene oil, at a temperature not to exceed 150° C. for the purposes specified.

GEORGE J. MILLER.